United States Patent
Goldstein et al.

(10) Patent No.: US 12,072,419 B2
(45) Date of Patent: Aug. 27, 2024

(54) PROCEDURALLY GENERATED THREE-DIMENSIONAL ENVIRONMENT FOR USE IN AUTONOMOUS VEHICLE SIMULATIONS

(71) Applicant: GM Cruise Holdings LLC, San Francisco, CA (US)

(72) Inventors: Benjamin Goldstein, San Francisco, CA (US); Gen Nishida, Daly City, CA (US); Eileen Bai, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 923 days.

(21) Appl. No.: 17/125,558

(22) Filed: Dec. 17, 2020

(65) Prior Publication Data

US 2022/0196839 A1   Jun. 23, 2022

(51) Int. Cl.
*G01S 17/00*       (2020.01)
*G01S 17/89*       (2020.01)
*G06T 17/20*       (2006.01)

(52) U.S. Cl.
CPC .............. *G01S 17/89* (2013.01); *G06T 17/20* (2013.01)

(58) Field of Classification Search
USPC ........................................................ 356/5.01
See application file for complete search history.

(56) References Cited

U.S. PATENT DOCUMENTS

| | | | |
|---|---|---|---|
| 2017/0200309 A1* | 7/2017 | Qian | G06T 15/04 |
| 2017/0301104 A1* | 10/2017 | Qian | G06F 16/583 |
| 2017/0307402 A1* | 10/2017 | Cherepinsky | G06T 15/005 |
| 2017/0314926 A1* | 11/2017 | Royster | G01C 5/005 |
| 2017/0314927 A1* | 11/2017 | Royster | G01C 21/005 |
| 2018/0144547 A1* | 5/2018 | Shakib | G06T 15/503 |
| 2018/0342080 A1* | 11/2018 | Maddern | G01C 21/3837 |
| 2020/0158898 A1* | 5/2020 | Le Guern | G01V 1/345 |
| 2020/0167059 A1* | 5/2020 | Luckey | G06F 3/0482 |
| 2020/0198130 A1* | 6/2020 | Goldberg | B25J 9/1697 |

(Continued)

FOREIGN PATENT DOCUMENTS

WO   WO-2018025660 A1 *  2/2018  .............. G09G 5/14

OTHER PUBLICATIONS

J. Beltrán et al., "A Method for Synthetic LiDAR Generation to Create Annotated Datasets for Autonomous Vehicles Perception," 2019 IEEE Intelligent Transportation Systems Conference (ITSC), Auckland, New Zealand, pp. 1091-1096 (Year: 2019).*

(Continued)

*Primary Examiner* — James R Hulka

(57) ABSTRACT

The disclosed technology provides solutions for generating synthetic 3D environments, In some aspects, the disclosed technology includes a process of synthetic environment generation that includes steps for collecting sensor data corresponding with a three-dimensional (3D) space, generating a 3D mesh based on the sensor data, and generating one or more synthetic 3D objects based on the 3D mesh and the sensor data. In some aspects, the process can further include steps for generating a 3D synthetic environment comprising the one or more synthetic 3D objects, wherein the 3D synthetic environment is generated based on the 3D mesh. Systems and machine-readable media are also provided.

17 Claims, 7 Drawing Sheets

(56) References Cited

U.S. PATENT DOCUMENTS

2020/0371494 A1* 11/2020 Warner .................. G06F 18/22
2021/0390789 A1* 12/2021 Liu ..................... G06V 40/161

OTHER PUBLICATIONS

D. Talwar, S. Guruswamy, N. Ravipati and M. Eirinaki, "Evaluating Validity of Synthetic Data in Perception Tasks for Autonomous Vehicles," 2020 IEEE International Conference On Artificial Intelligence Testing (AITest), Oxford, UK, pp. 73-80 (Year: 2020).*
L. Roldão, R. de Charette and A. Verroust-Blondet, "3D Surface Reconstruction from Voxel-based Lidar Data," 2019 IEEE Intelligent Transportation Systems Conference (ITSC), Auckland, New Zealand, pp. 2681-2686, (Year: 2019).*
G. Christie et al., "Training Object Detectors with Synthetic Data for Autonomous UAV Sampling Applications," 2018 International Conference on Unmanned Aircraft Systems (ICUAS), Dallas, TX, USA, pp. 352-357 (Year: 2018).*

* cited by examiner

PROCEDURALLY GENERATED THREE-DIMENSIONAL ENVIRONMENT FOR USE IN AUTONOMOUS VEHICLE SIMULATIONS

BACKGROUND

1. Technical Field

The subject technology relates to solutions for generating synthetic three-dimensional (3D) environments and in particular, for generating synthetic 3D environments for use in performing autonomous vehicle (AV) simulations.

2. Introduction

Autonomous vehicles (AVs) are vehicles having computers and control systems that perform driving and navigation tasks that are conventionally performed by a human driver. As AV technologies continue to advance, AVs will be required to perform many of the functions that are conventionally performed by human drivers, such as avoiding dangerous or difficult routes, and performing other navigation and routing tasks necessary to provide safe and efficient transportation. Such tasks may require the collection and processing of large quantities of data using various sensor types, including but not limited to cameras and/or Light Detection and Ranging (LiDAR) sensors disposed on the AV. Additionally, AV maneuvering and navigation functions can be improved through the use of high-definition maps, for example, that can support high accuracy AV localization and sensor validation processes.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

In typical AV localization processes, environmental (sensor) data is collected by the AV for comparison against HD maps, for example, that are generated from high-fidelity sensor data collected by specialized mapping vehicles and pre-stored to the AV. However, because the process of collecting map sensor data and generating real-world HD maps is time consuming, it would be advantageous to utilize synthetic (virtual) three-dimensional (3D) environments in which AV behavior can be accurately simulated. In particular, it would be advantageous to recreate AV behavior in a simulated environment using inputs that are identical to (or nearly identical to) real world data. As discussed in further detail below, the validity of such simulation techniques can be measured by the ability of the AV stack to produce outputs that are identical (or nearly identical) those that would result if real-world input data was used.

Aspects of the disclosed technology address the foregoing limitations by providing solutions for generating complete (continuous) synthetic 3D environments that can be used to facilitate AV testing and calibration operations, such as by improving AV stack convergence in simulated environments. As discussed in further detail below, the disclosed technology includes a process for using real-world sensor data to seed a synthetic environment generation process. Resulting synthetic environments can include synthetic 3D objects/features, e.g., buildings, sidewalks, road signs, etc., that can be used to simulate AV navigation through various map areas.

Figure 1A:
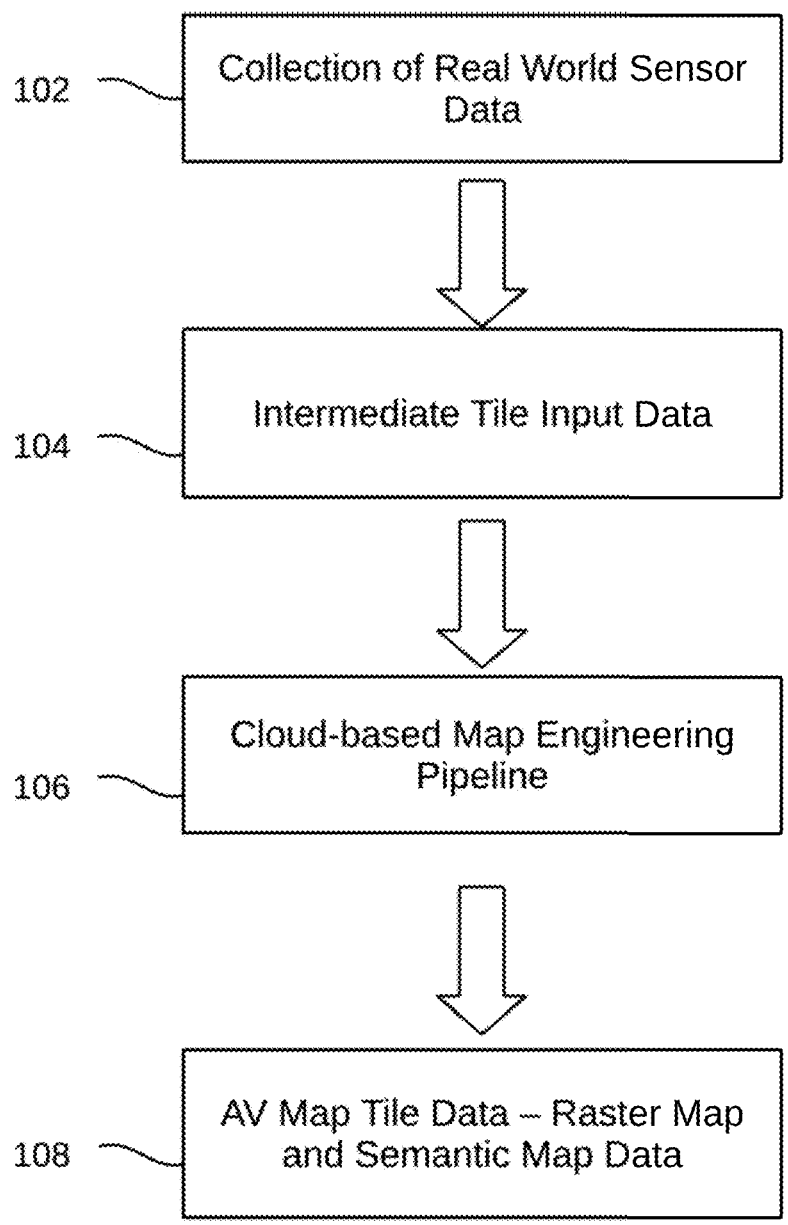
FIG. 1A illustrates a block diagram of example steps for generating high-definition map tile data for a real-world environment, according to some aspects of the disclosed technology.

FIG. 1A illustrates a block diagram of a process 100 for generating high-definition map tile data from a real-world environment. Process 100 begins with block 102 in which real-world sensor data is collected, for example, using a specialized mapping vehicle. The mapping vehicle can be equipped with high-sensitivity sensors configured for collecting environmental data for the environs surrounding the AV. It is understood that various types of sensors may be used, including, but not limited to one or more: Light Detection and Ranging (LiDAR) sensors, cameras, radar systems, Global Positioning System (GPS) devices, and/or accelerometers, etc.

In block 104, the collected sensor data is parsed into a tile format, such as a unified tile render (UTR) format to facilitate downstream processing. Subsequently, at block 106, the map-tiles are processed, for example, to add labels to various map features, such as roadways, traffic signs, traffic boundaries, and other static or semi-static map features. Labeling can be performed manually, for example, by a human administrator or operator. However, in some implementations, automated machine-based labeling can be used, and/or can be implemented to supplement portions of a manual labeling process. By way of example, machine-based labeling can employ machine-learning classification models and/or algorithm-based detectors to identify various map/object features and to supplement the intermediate tile data with semantic labels.

In block 108, map tiles that include a combination of raster map and semantic map data are generated. In application, the map tiles can be downloaded to an AV and used for comparison against collected sensor data, e.g., to perform localization, maneuvering, and/or navigation operations. In such cases, the HD map tile data can be used to validate real-world sensor data collected by the AV sensors, for example, based on an amount (or degree) of agreement between the collected sensor data and the a priori representation of the real-world provided by the map tile data. In some aspects, the map tile data can additionally be used to generate (seed) synthetic (virtual) 3D environments, as discussed in further detail with respect to FIG. 1B.

Figure 1B:
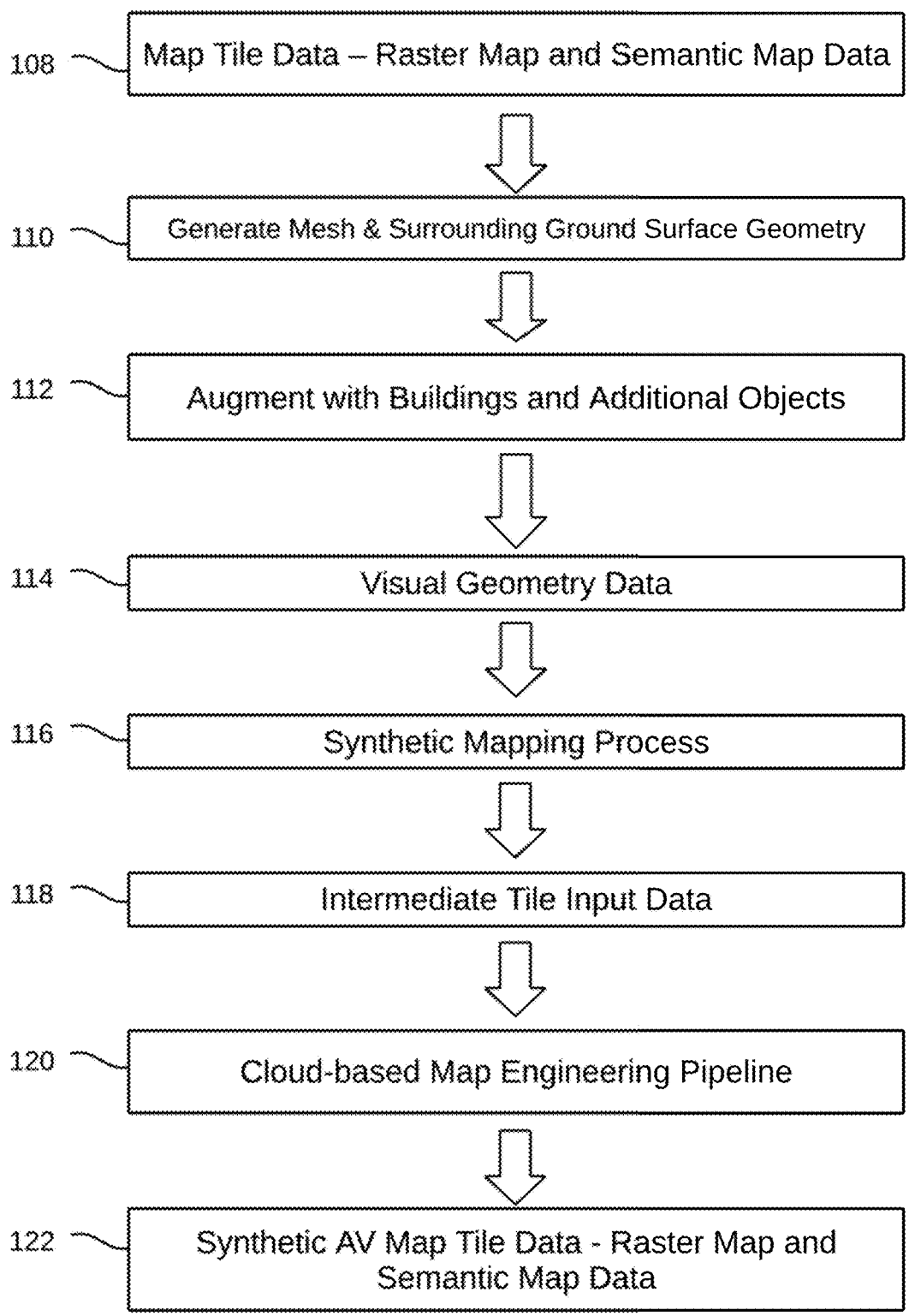
FIG. 1B illustrates a block diagram of example steps for generating high-definition map tile-data for a synthetic environment, according to some aspects of the disclosed technology.

FIG. 1B, illustrates a block diagram of example process 109 for generating high-definition map tile-data for a synthetic (virtual) environment. Process 109 continues from block 108, in which the real-world AV map tile data generated by process 100, is received. The real-world map tile data can be used to supply real-world features, such as roadway and building footprint locations, that can be used to seed the generation of a 3D synthetic environment, for example, that includes synthetic objects, such as buildings, as discussed below.

In block 110, various meshes, including the ground surface geometry is generated. The mesh can identify a basic layout for the synthetic environment, including the locations of features, such as buildings, roadways, intersections, walkable surfaces, and/or other transportation infrastructure, that are based on corresponding features in the real-world map tile data (108).

In block 112, synthetic objects are generated and added to the mesh. The generated synthetic objects can correspond with (or represent) virtually any object that can be detected by an AV sensor in the real-world. In some approaches, the synthetic objects can include any static or semi-static objects, for example, that do not change position/location in a highly dynamic manner. By way of example, the synthetic objects can include, but are not limited to one or more: buildings, traffic signals, light posts, bike stations, trees, stop-signs, etc.

In block 114, visual geometry data is generated to form a 3D synthetic environment. The resulting synthetic environment can represent a 3D virtual space containing entirely novel and continuous synthetic features and objects (e.g., buildings, lamp posts, etc.), while also providing some correspondence to real-world topographic features (e.g., roadways, and building locations/footprints, etc.). The synthetic 3D environment can then be used to generate a synthetic 3D map, for example, using a synthetic mapping process (block 116). Subsequently, the synthetic map can be parsed into intermediate tile data (block 118). Similar to block 104 discussed above in relation to FIG. 1C, the synthetic map tile data (block 118) can represent map data that is stored in a format optimized for consumption by an AV stack. However, in contrast to the map tile data described with respect to block 104, the intermediate (synthetic) (118) map tile data contains representations of synthetic objects from the synthetic environment.

Subsequently, at block 120, a (self-serve) cloud-based engineering pipeline is used to add labels to those features of the synthetic environment that have correspondence to real-world features/objects. In some implementations, existing semantic labels can be copied or re-used for corresponding features in the synthetic map. In this manner, the synthetic 3D map data can be enriched with semantic label information without the need to repeat the labeling process, which can be expensive and time-consuming. As such, the resulting synthetic AV map tile data (block 122) can include map tiles for a synthetic map generated from a synthetic environment, while also being complete with semantic labels for certain features (e.g., intersections, roadways, building locations), that have real-world correspondence.

Figure 1C:
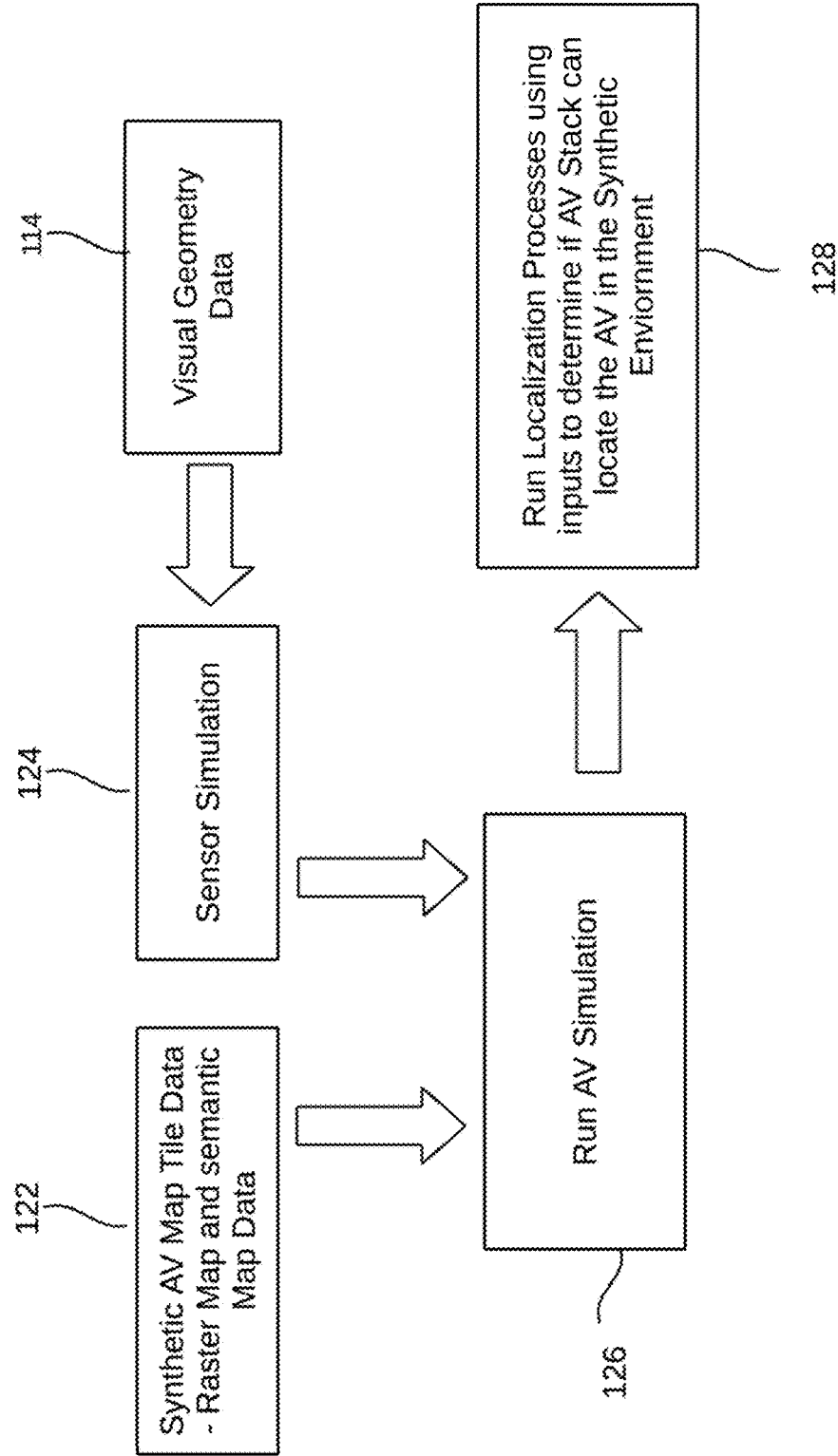
FIG. 1C illustrates a block diagram of an example process for running an AV simulation using a 3D synthetic environment, according to some aspects of the disclosed technology.

FIG. 1C illustrates a block diagram of an example process 121 for running an AV simulation. As illustrated by process 121, visual geometry data representing the synthetic 3D environment (114) is provided to one or more simulated AV sensors (124), for example, to simulation AV navigation within the 3D synthetic environment (126). Additionally, AV map tile data (122) is provided to the AV simulation (122). As such, synthetic sensor data collected from the sensor simulation process (124) can be used for comparison with the synthetic map tile data (122), for example, to facilitate the simulation of various AV processes. By way of example, the synthetic sensor data can be used to measure AV localization stack convergence in the synthetic environment (128).

Figure 2:
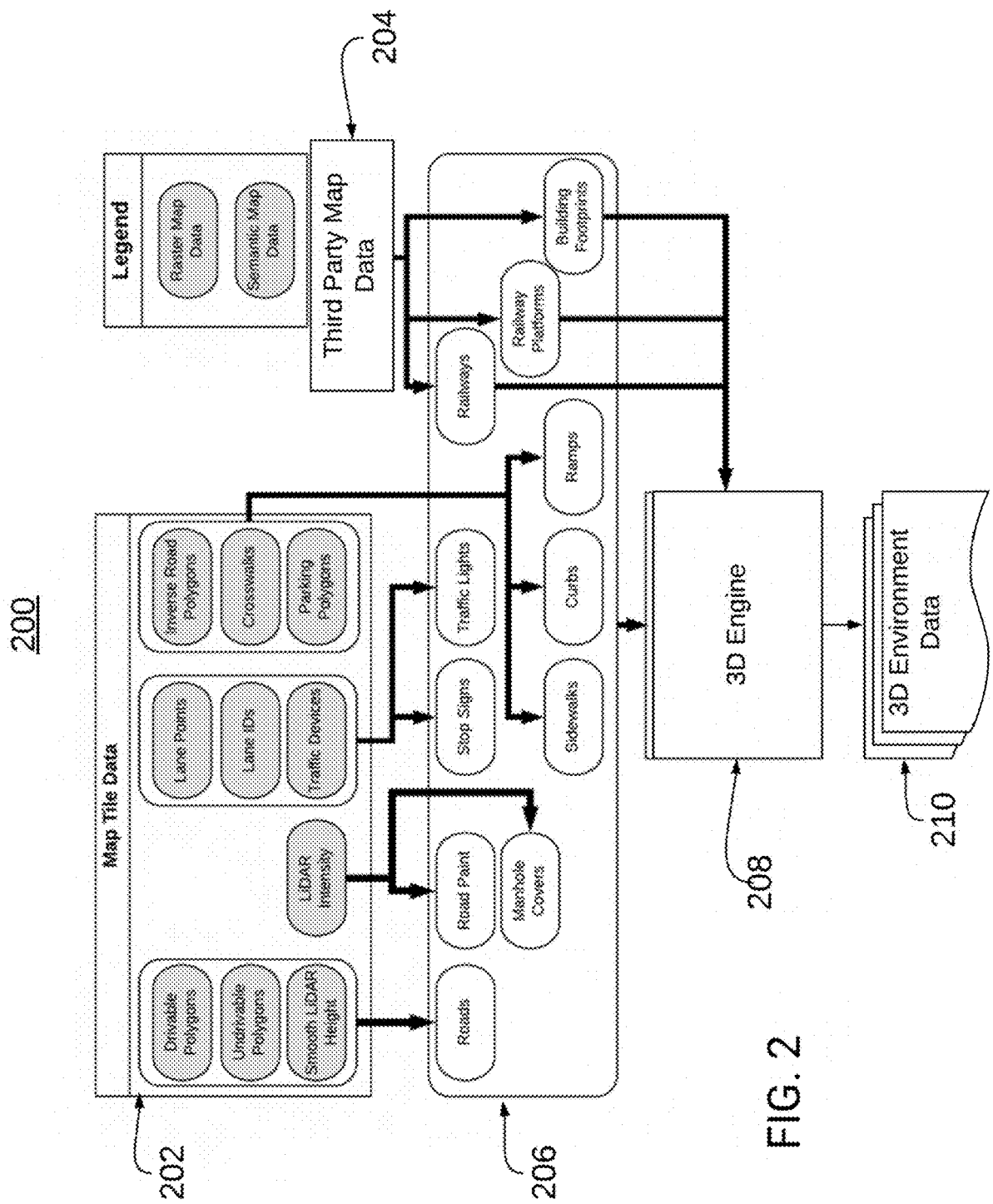
FIG. 2 illustrates a conceptual block diagram of a system for generating a synthetic 3D environment, according to some aspects of the disclosed technology.

FIG. 2 illustrates a conceptual block diagram of an example system 200 for generating a synthetic environment. System 200 includes various types of real-world data, e.g., map tile data 202 and third party map data 204 that can be used to seed generation of various synthetic geometries and objects. Although the example of system 200 includes map tile data 202 and third party map data 204, it is understood that different (or additional) types of real-world data may be used to seed generation of various synthetic environment components, without departing from the scope of the disclosed technology.

In the example of system 200, map tile data 202 can include real-world sensor data (e.g., recorded using one or more AV sensors), as well as ground-truth data (e.g., polygons and/or semantic labels), for example, that are provided by a manual labeling or tagging process. As illustrated, map tile data 202 includes drivable polygons (representing drivable roadway surfaces), undrivable polygons (representing undrivable surfaces), and LiDAR height data (indicating elevation parameters for various map surfaces). Map tile data 202 can also include LiDAR intensity data that indicates LiDAR return intensities for different features, including roadway paint, and/or manhole coverings, etc. In some aspects, map tile data 202 can include collected sensor data and semantic labels (e.g., lane points, lane IDs, traffic devices) that can define traffic control objects, such as roadway signage and/or traffic lights. Additionally, map tile data 202 can include polygons defining certain non-roadway surfaces, e.g., inverse road polygons, crosswalks, parking polygons, etc. In some aspects, third party map data 204 can be used to provide real-world (ground truth) inputs for significant features, such as transportation structures, e.g., railways, railway platforms, and/or other large objects, e.g., buildings, etc.

The real-world seed data (e.g., map tile data 202, and third party map data 204) are then used to create synthetic geometries for use in generating a synthetic 3D map. In the example of system 200, unreal (synthetic) import meshes derived from map tile data 202 can represent features for synthetic driving surfaces (e.g., roads, road paint, manhole covers), as well as locations of traffic control objects (road signs, traffic lights) and/or non-roadway surfaces (e.g., sidewalks, curbs, ramps, etc.). Synthetic import meshes for other features may be derived from third party map data 204, including, for example, railways, railway platforms, and/or building footprints etc.

After synthetic object meshes have been created, the meshes and other object data can be assembled/collated (206) and imported into a 3D engine (208) to generate corresponding synthetic objects, e.g., buildings and other structures. Synthetic objects can include but are not limited to street lights, railway racks, railway platforms, and buildings. It is understood that the synthetic mesh geometries and synthetic objects described above are provided as examples, and that different geometries and/or objects can be generated, without departing from the scope of the disclosed technology.

By integrating synthetic meshes and associated synthetic objects, full 3D synthetic environments can be generated, e.g., as represented by the outputted environment data 210. As discussed above, the resulting 3D synthetic environments can be used for AV simulations. For example, AV navigation and data collection through various portions of a synthetic 3D environment can be used to facilitate localization and sensor calibration processes.

Figure 3:
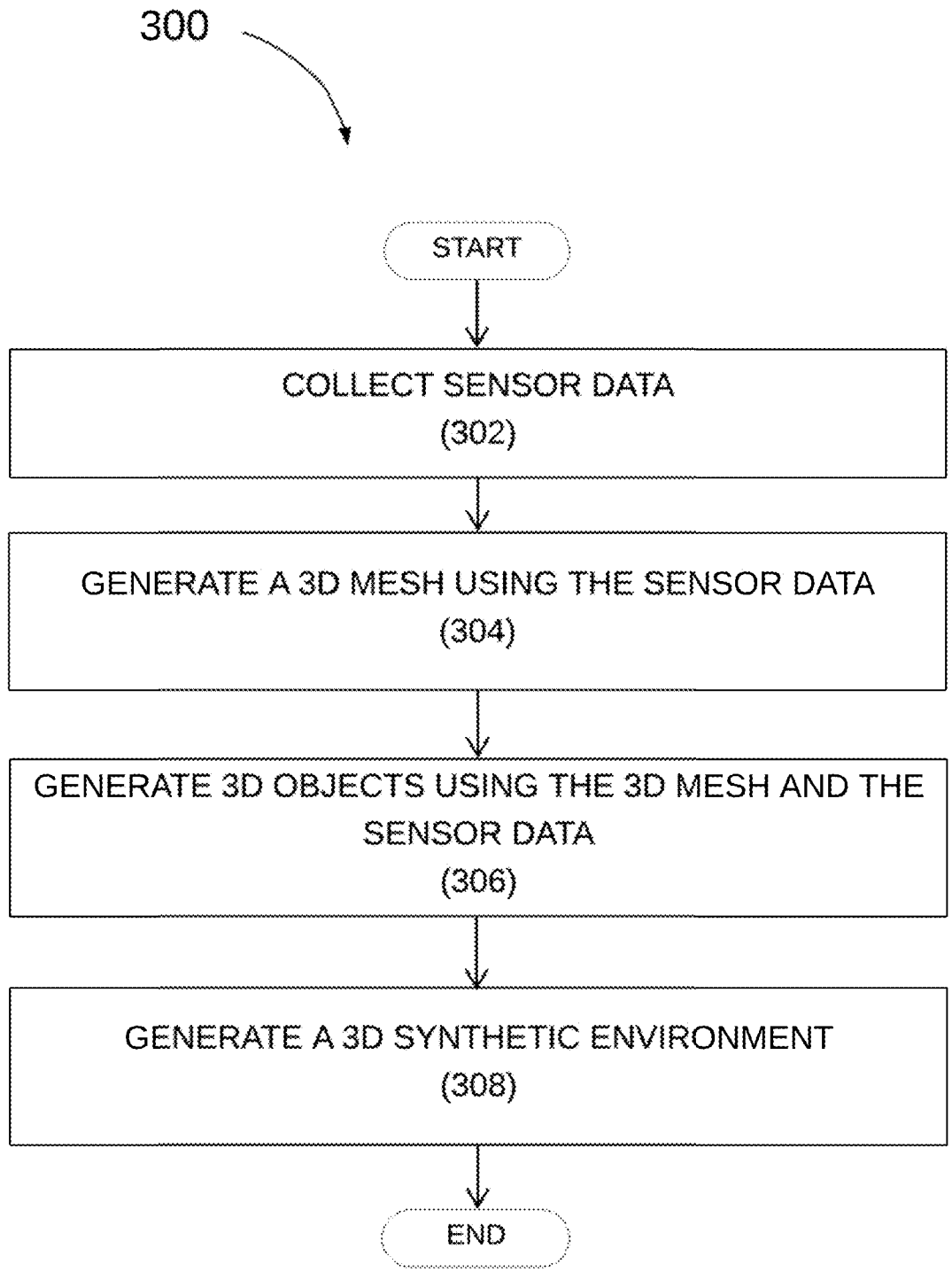
FIG. 3 illustrates steps of an example process for generating a synthetic 3D environment, according to some aspects of the disclosed technology.

FIG. 3 illustrates steps of an example process 300 for generating a synthetic 3D environment, according to some aspects of the disclosed technology. Process 300 begins with step 302 in which sensor data (e.g., environmental data) is collected using one or more sensors. In some aspects, the sensors can be AV environmental sensors disposed on, or mounted to, an AV. As such, the collected sensor data can represent measurements of various features of a real-world environment, such as portions of a city, such as San Francisco, CA, corresponding to a particular map area.

In step 304, a 3D mesh is generated (seeded) from the sensor data. As discussed above, the synthetic 3D mesh can represent basic real-world features, such as roadways and building locations. By way of further example, the 3D mesh can indicate the boundaries of large transportation structures, such as bridges, on/off ramps, and/or roadways, etc.

In step 306 one or more synthetic 3D objects are generated based on the 3D mesh and the sensor data (environmental data). By way of example, the 3D objects can include virtually any environmental structures, such as buildings, lamp posts, traffic signs, and/or traffic lights, etc. As discussed above, real-world sensor data can include the use of ground-truth data inputs (e.g., semantic labels and/or polygons), including data from third-party sources. Subsequently, in step 308, a synthetic 3D environment is generated from the 3D mesh and synthetic 3D objects. As discussed above, the 3D environment can be configured to facilitate AV simulations, as discussed above with respect to FIG. 1C.

Figure 4:
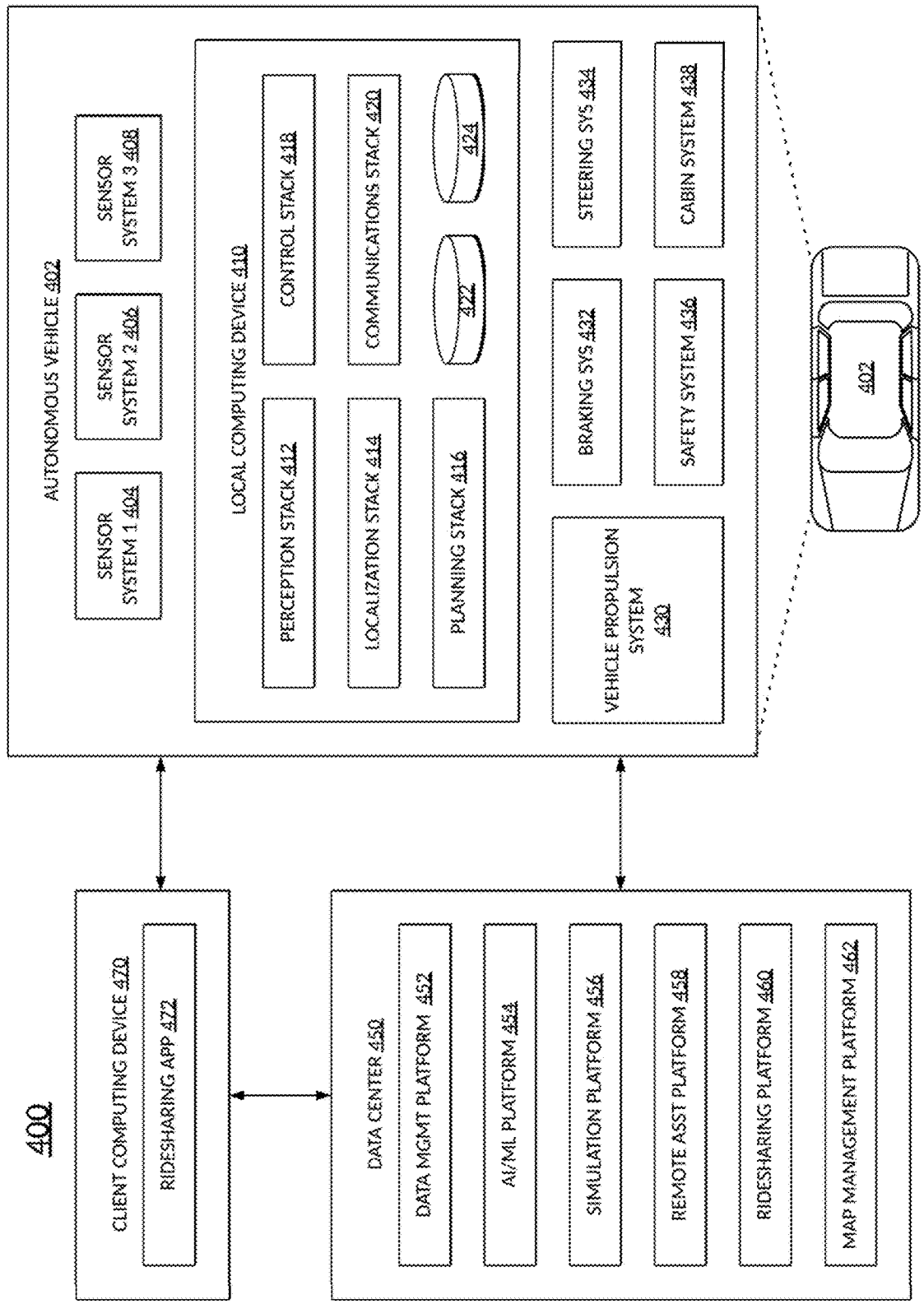
FIG. 4 illustrates an example system environment that can be used to facilitate AV dispatch and operations, according to some aspects of the disclosed technology.

Turning now to FIG. 4 illustrates an example of an AV management system 400. One of ordinary skill in the art will understand that, for the AV management system 400 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 400 includes an AV 402, a data center 450, and a client computing device 470. The AV 402, the data center 450, and the client computing device 470 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 402 can navigate about roadways without a human driver based on sensor signals generated by multiple sensor systems 404, 406, and 408. The sensor systems 404-408 can include different types of sensors and can be arranged about the AV 402. For instance, the sensor systems 404-408 can comprise Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 404 can be a camera system, the sensor system 406 can be a LIDAR system, and the sensor system 408 can be a RADAR system. Other embodiments may include any other number and type of sensors.

AV 402 can also include several mechanical systems that can be used to maneuver or operate AV 402. For instance, the mechanical systems can include vehicle propulsion system 430, braking system 432, steering system 434, safety system 436, and cabin system 438, among other systems. Vehicle propulsion system 430 can include an electric motor, an internal combustion engine, or both. The braking system 432 can include an engine brake, brake pads, actuators, and/or any other suitable componentry configured to assist in decelerating AV 402. The steering system 434 can include suitable componentry configured to control the direction of movement of the AV 402 during navigation. Safety system 436 can include lights and signal indicators, a parking brake, airbags, and so forth. The cabin system 438 can include cabin temperature control systems, in-cabin entertainment systems, and so forth. In some embodiments, the AV 402 may not include human driver actuators (e.g., steering wheel, handbrake, foot brake pedal, foot accelerator pedal, turn signal lever, window wipers, etc.) for controlling the AV 402. Instead, the cabin system 438 can include one or more client interfaces (e.g., Graphical User Interfaces (GUIs), Voice User Interfaces (VUIs), etc.) for controlling certain aspects of the mechanical systems 430-438.

AV 402 can additionally include a local computing device 410 that is in communication with the sensor systems 404-408, the mechanical systems 430-438, the data center 450, and the client computing device 470, among other systems. The local computing device 410 can include one or more processors and memory, including instructions that can be executed by the one or more processors. The instructions can make up one or more software stacks or components responsible for controlling the AV 402; communicating with the data center 450, the client computing device 470, and other systems; receiving inputs from riders, passengers, and other entities within the AV's environment; logging metrics collected by the sensor systems 404-408; and so forth. In this example, the local computing device 410 includes a perception stack 412, a mapping and localization stack 414, a planning stack 416, a control stack 418, a communications stack 420, an HD geospatial database 422, and an AV operational database 424, among other stacks and systems.

Perception stack 412 can enable the AV 402 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 404-408, the mapping and localization stack 414, the HD geospatial database 422, other components of the AV, and other data sources (e.g., the data center 450, the client computing device 470, third-party data sources, etc.). The perception stack 412 can detect and classify objects and determine their current and predicted locations, speeds, directions, and the like. In addition, the perception stack 412 can determine the free space around the AV 402 (e.g., to maintain a safe distance from other objects, change lanes, park the AV, etc.). The perception stack 412 can also identify environmental uncertainties, such as where to look for moving objects, flag areas that may be obscured or blocked from view, and so forth.

Mapping and localization stack 414 can determine the AV's position and orientation (pose) using different methods from multiple systems (e.g., GPS, IMUs, cameras, LIDAR, RADAR, ultrasonic sensors, the HD geospatial database 422, etc.). For example, in some embodiments, the AV 402 can compare sensor data captured in real-time by the sensor systems 404-408 to data in the HD geospatial database 422 to determine its precise (e.g., accurate to the order of a few centimeters or less) position and orientation. The AV 402 can focus its search based on sensor data from one or more first sensor systems (e.g., GPS) by matching sensor data from one or more second sensor systems (e.g., LIDAR). If the mapping and localization information from one system is unavailable, the AV 402 can use mapping and localization information from a redundant system and/or from remote data sources.

The planning stack 416 can determine how to maneuver or operate the AV 402 safely and efficiently in its environment. For example, the planning stack 416 can receive the location, speed, and direction of the AV 402, geospatial data, data regarding objects sharing the road with the AV 402 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 402 from one point to another. The planning stack 416 can determine multiple sets of one or more mechanical operations that the AV 402 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 416 can select from multiple backup plans to carry out. For example, while preparing to change lanes to turn right at an intersection, another vehicle may aggressively cut into the destination lane, making the lane change unsafe. The planning stack 416 could have already determined an alternative plan for such an event, and upon its occurrence, help to direct the AV 402 to go around the block instead of blocking a current lane while waiting for an opening to change lanes.

The control stack 418 can manage the operation of the vehicle propulsion system 430, the braking system 432, the steering system 434, the safety system 436, and the cabin system 438. The control stack 418 can receive sensor signals from the sensor systems 404-408 as well as communicate with other stacks or components of the local computing device 410 or a remote system (e.g., the data center 450) to effectuate operation of the AV 402. For example, the control stack 418 can implement the final path or actions from the multiple paths or actions provided by the planning stack 416. This can involve turning the routes and decisions from the planning stack 416 into commands for the actuators that control the AV's steering, throttle, brake, and drive unit.

The communication stack 420 can transmit and receive signals between the various stacks and other components of the AV 402 and between the AV 402, the data center 450, the client computing device 470, and other remote systems. The communication stack 420 can enable the local computing device 410 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 420 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 422 can store HD maps and related data of the streets upon which the AV 402 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal U-turn lanes; permissive or protected only right turn lanes; etc.). The traffic controls lane can include geospatial information of traffic signal lights, traffic signs, and other road objects and related attributes.

The AV operational database 424 can store raw AV data generated by the sensor systems 404-408 and other components of the AV 402 and/or data received by the AV 402 from remote systems (e.g., the data center 450, the client computing device 470, etc.). In some embodiments, the raw AV data can include HD LIDAR point cloud data, image data, RADAR data, GPS data, and other sensor data that the data center 450 can use for creating or updating AV geospatial data as discussed further below with respect to FIG. 2 and elsewhere in the present disclosure.

The data center 450 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 450 can include one or more computing devices remote to the local computing device 410 for managing a fleet of AVs and AV-related services. For example, in addition to managing the AV 402, the data center 450 may also support a ridesharing service, a delivery service, a remote/roadside assistance service, street services (e.g., street mapping, street patrol, street cleaning, street metering, parking reservation, etc.), and the like.

The data center 450 can send and receive various signals to and from the AV 402 and client computing device 470. These signals can include sensor data captured by the sensor systems 404-408, roadside assistance requests, software updates, ridesharing pick-up and drop-off instructions, and so forth. In this example, the data center 450 includes a data management platform 452, an Artificial Intelligence/Machine Learning (AI/ML) platform 454, a simulation platform 456, a remote assistance platform 458, a ridesharing platform 460, and map management system platform 462, among other systems.

Data management platform 452 can be a "big data" system capable of receiving and transmitting data at high velocities (e.g., near real-time or real-time), processing a large variety of data, and storing large volumes of data (e.g., terabytes, petabytes, or more of data). The varieties of data can include data having different structure (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 450 can access data stored by the data management platform 452 to provide their respective services.

The AI/ML platform 454 can provide the infrastructure for training and evaluating machine learning algorithms for operating the AV 402, the simulation platform 456, the remote assistance platform 458, the ridesharing platform 460, the map management system platform 462, and other platforms and systems. Using the AI/ML platform 454, data scientists can prepare data sets from the data management platform 452; select, design, and train machine learning models; evaluate, refine, and deploy the models; maintain, monitor, and retrain the models; and so on.

The simulation platform 456 can enable testing and validation of the algorithms, machine learning models, neural networks, and other development efforts for the AV 402, the remote assistance platform 458, the ridesharing platform 460, the map management system platform 462, and other platforms and systems. The simulation platform 456 can replicate a variety of driving environments and/or reproduce real-world scenarios from data captured by the AV 402, including rendering geospatial information and road infrastructure (e.g., streets, lanes, crosswalks, traffic lights, stop signs, etc.) obtained from the map management system platform 462; modeling the behavior of other vehicles, bicycles, pedestrians, and other dynamic elements; simulating inclement weather conditions, different traffic scenarios; and so on.

The remote assistance platform 458 can generate and transmit instructions regarding the operation of the AV 402. For example, in response to an output of the AI/ML platform 454 or other system of the data center 450, the remote assistance platform 458 can prepare instructions for one or more stacks or other components of the AV 402.

The ridesharing platform 460 can interact with a customer of a ridesharing service via a ridesharing application 472 executing on the client computing device 470. The client computing device 470 can be any type of computing system, including a server, desktop computer, laptop, tablet, smartphone, smart wearable device (e.g., smart watch, smart eyeglasses or other Head-Mounted Display (HMD), smart ear pods or other smart in-ear, on-ear, or over-ear device, etc.), gaming system, or other general purpose computing device for accessing the ridesharing application 472. The client computing device 470 can be a customer's mobile computing device or a computing device integrated with the AV 402 (e.g., the local computing device 410). The ridesharing platform 460 can receive requests to be picked up or dropped off from the ridesharing application 472 and dispatch the AV 402 for the trip.

Map management system platform 462 can provide a set of tools for the manipulation and management of geographic and spatial (geospatial) and related attribute data. The data management platform 452 can receive LIDAR point cloud data, image data (e.g., still image, video, etc.), RADAR data, GPS data, and other sensor data (e.g., raw data) from one or more AVs 402, UAVs, satellites, third-party mapping services, and other sources of geospatially referenced data. The raw data can be processed, and map management system platform 462 can render base representations (e.g., tiles (2D), bounding volumes (3D), etc.) of the AV geospatial data to enable users to view, query, label, edit, and otherwise interact with the data. Map management system platform 462 can manage workflows and tasks for operating on the AV geospatial data. Map management system platform 462 can control access to the AV geospatial data, including granting or limiting access to the AV geospatial data based on user-based, role-based, group-based, task-based, and other attribute-based access control mechanisms. Map management system platform 462 can provide version control for the AV geospatial data, such as to track specific changes that (human or machine) map editors have made to the data and to revert changes when necessary. Map management system platform 462 can administer release management of the AV geospatial data, including distributing suitable iterations of the data to different users, computing devices, AVs, and other consumers of HD maps. Map management system platform 462 can provide analytics regarding the AV geospatial data and related data, such as to generate insights relating to the throughput and quality of mapping tasks.

In some embodiments, the map viewing services of map management system platform 462 can be modularized and deployed as part of one or more of the platforms and systems of the data center 450. For example, the AI/ML platform 454 may incorporate the map viewing services for visualizing the effectiveness of various object detection or object classification models, the simulation platform 456 may incorporate the map viewing services for recreating and visualizing certain driving scenarios, the remote assistance platform 458 may incorporate the map viewing services for replaying traffic incidents to facilitate and coordinate aid, the ridesharing platform 460 may incorporate the map viewing services into the client application 472 to enable passengers to view the AV 402 in transit en route to a pick-up or drop-off location, and so on.

Figure 5:
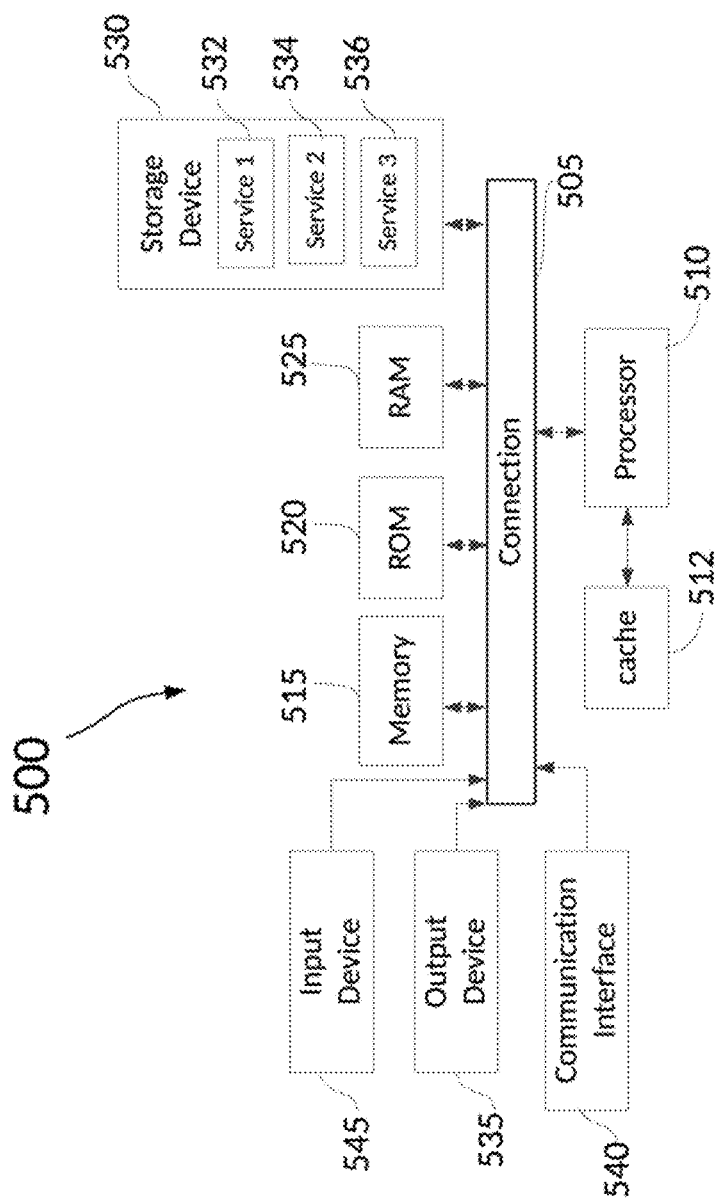
FIG. 5 illustrates an example processor-based system with which some aspects of the subject technology can be implemented.

FIG. 5 illustrates an example processor-based system with which some aspects of the subject technology can be implemented. For example, processor-based system 500 can be any computing device making up internal computing system 510, remote computing system 550, a passenger device executing the rideshare app 570, internal computing device 530, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communication interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

Storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A computer-implemented method for generating a synthetic map, comprising:
    collecting, by an autonomous vehicle traversing a real-world environment, sensor data corresponding with a three-dimensional (3D) space in the real-world scene and first outputs of an autonomous vehicle stack as the autonomous vehicle traverses the real-world environment;
    generating a 3D mesh based on the sensor data;
    generating one or more synthetic 3D objects based on the 3D mesh and the sensor data;
    generating a 3D synthetic environment comprising the one or more synthetic 3D objects, wherein the 3D synthetic environment is generated based on the 3D mesh;
    simulating navigation of a simulated autonomous vehicle, which is operating using the autonomous vehicle stack, through at least a portion of the 3D map to generate a second outputs of the autonomous vehicle stack; and
    comparing the first outputs of the autonomous vehicle stack to the second outputs of the autonomous vehicle stack to determine a validity of the 3D synthetic environment.

2. The computer-implemented method of claim 1, wherein the sensor data comprises Light Detection and Ranging (LiDAR) sensor data collected by the autonomous vehicle.

3. The computer-implemented method of claim 1, wherein the sensor data comprises Light Detection and Ranging (LiDAR) sensor data associated with one or more roadways.

4. The computer-implemented method of claim 1, wherein generating the 3D mesh based on the sensor data, further comprises:
    seeding the 3D mesh using the sensor data.

5. The computer-implemented method of claim 1, wherein the 3D mesh comprises a footprint for one or more buildings.

6. The computer-implemented method of claim 1, wherein the one or more comprises one or more: buildings, cross walks, traffic lights, stop signs, or sidewalks.

7. A system comprising:
    one or more processors; and
    a computer-readable medium comprising instructions stored therein, which when executed by the one or more processors, cause the one or more processors to perform operations comprising:

collecting, by a first vehicle traversing a real-world environment, first sensor data corresponding with a three-dimensional (3D) space in the real-world scene;

parsing the first sensor data into a tile format for downstream processing;

generating a set of map tiles based on the first sensor data in the tile format and a set of labels, wherein the set of map tiles include a combination of raster map and semantic map data;

collecting, by a second vehicle, which is an autonomous vehicle, traversing the real-world environment, second sensor data corresponding with the three-dimensional (3D) space in the real-world scene;

performing one or more of localization, maneuvering, and navigation using the second sensor data and the set of map tiles to determine the validity of the second sensor data based on the set of map tiles;

generating, following validation, a 3D mesh based on the set of map tiles;

generating one or more synthetic 3D objects based on the 3D mesh and the first sensor data; and generating a 3D synthetic map comprising the one or more synthetic 3D objects, wherein the 3D synthetic environment is generated based on the 3D mesh.

8. The system method of claim 7, wherein the first sensor data comprises Light Detection and Ranging (LiDAR) sensor data collected by an autonomous vehicle (AV).

9. The system method of claim 7, wherein the first sensor data comprises Light Detection and Ranging (LiDAR) sensor data associated with one or more roadways.

10. The system method of claim 7, wherein generating the 3D mesh based on the set of map tiles, further comprises:
seeding the 3D mesh using the set of map tiles.

11. The system method of claim 7, wherein the 3D mesh comprises a foot-print for one or more buildings.

12. The system method of claim 7, wherein the one or more synthetic objects comprises one or more: buildings, cross walks, traffic lights, stop signs, or sidewalks.

13. A non-transitory computer-readable storage medium comprising instructions stored therein, which when executed by one or more processors, cause the processors to perform operations comprising:

collecting, by an autonomous vehicle traversing a real-world environment, sensor data corresponding with a three-dimensional (3D) space in the real-world scene and first outputs of an autonomous vehicle stack as the autonomous vehicle traverses the real-world environment;

generating a 3D mesh based on the sensor data;

generating one or more synthetic 3D objects based on the 3D mesh and the sensor data;

generating a 3D synthetic environment comprising the one or more synthetic 3D objects, wherein the 3D synthetic environment is generated based on the 3D mesh;

simulating navigation of a simulated autonomous vehicle, which is operating using the autonomous vehicle stack, through at least a portion of the 3D map to generate a second outputs of the autonomous vehicle stack; and comparing the first outputs of the autonomous vehicle stack to the second outputs of the autonomous vehicle stack to determine a validity of the 3D synthetic environment.

14. The non-transitory computer-readable storage medium of claim 13, wherein the sensor data comprises Light Detection and Ranging (LiDAR) sensor data collected by the autonomous vehicle.

15. The non-transitory computer-readable storage medium of claim 13, wherein the sensor data comprises Light Detection and Ranging (LiDAR) sensor data associated with one or more roadways.

16. The non-transitory computer-readable storage medium of claim 13, wherein generating the 3D mesh based on the sensor data, further comprises:
seeding the 3D mesh using the sensor data.

17. The non-transitory computer-readable storage medium of claim 13, wherein the 3D mesh comprises a foot-print for one or more buildings.

* * * * *